Patented Mar. 23, 1926.

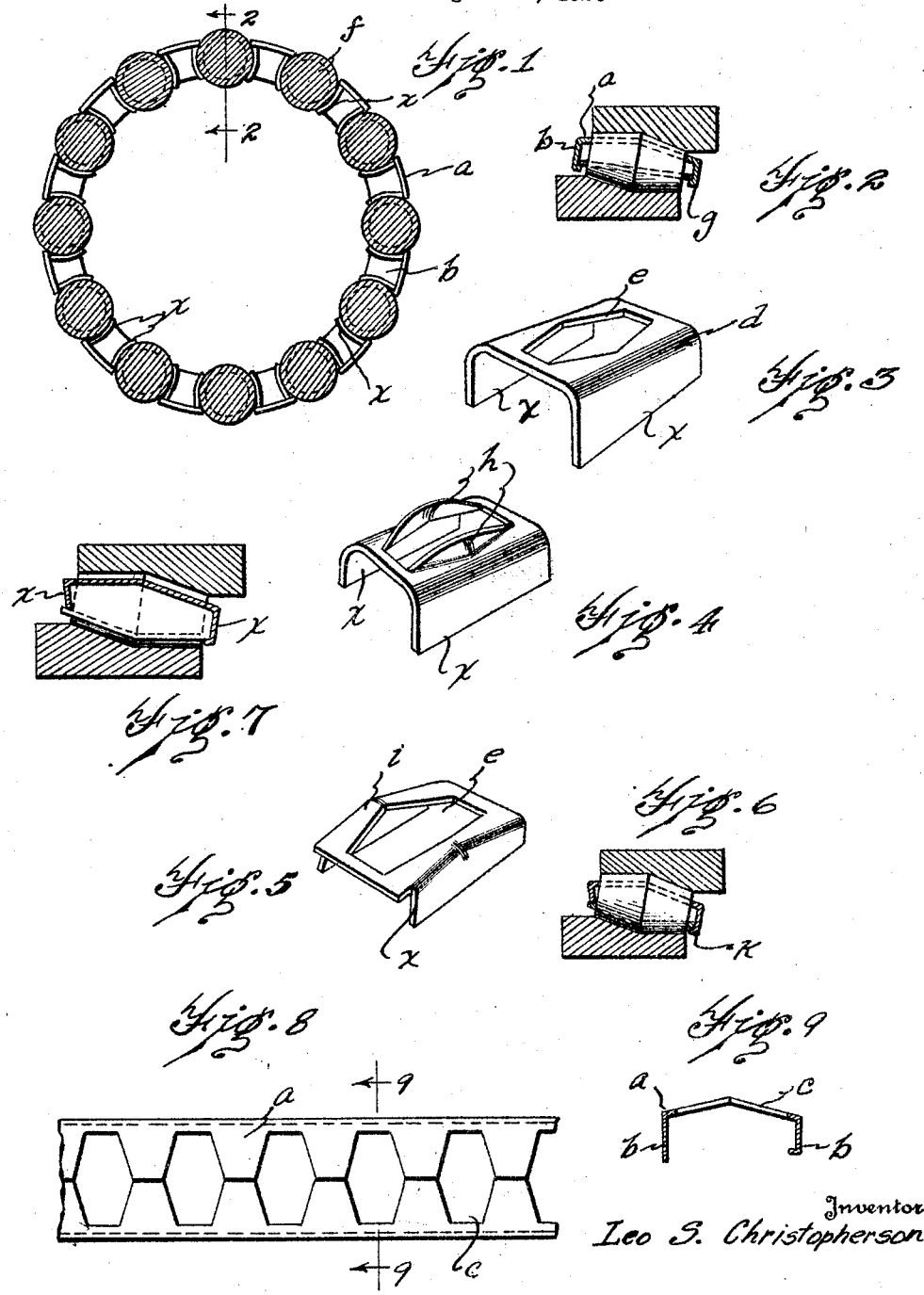

1,577,786

UNITED STATES PATENT OFFICE.

LEO S. CHRISTOPHERSON, OF SPOKANE, WASHINGTON, ASSIGNOR TO CHRIS DOUBLE TAPER BEARING COMPANY, OF SPOKANE, WASHINGTON, A CORPORATION OF WASHINGTON.

BEARING CAGE.

Application filed August 27, 1924. Serial No. 734,418.

*To all whom it may concern:*

Be it known that I, LEO S. CHRISTOPHERSON, a citizen of the United States, residing at Spokane, in the county of Spokane and State of Washington, have invented certain new and useful Improvements in Bearing Cages, of which the following is a specification.

This invention relates to a bearing cage and is more particularly adapted to a cage for housing roller bearings. I have shown here two-tapered roller bearings, though obviously conical or straight rollers could be used as well. One of the advantages of this construction is the novel means of assembly in which each roller is separately secured to the outer barrel portion, sometimes spoken of as the outer cage. My object is to separately secure each roller to the outer cage, thereby allowing any number of rollers to be secured to the cage. Another object is to provide individual housings for each roller, these housings securely supporting and holding the rollers in the outer cage so that the same may not be dislodged when slightly worn or allowed to have too much play, which will cause a rattling and noise between the bearing parts.

In the drawings:

Fig. 1 is a vertical sectional view through my bearing, showing a plurality of roller elements secured therein.

Fig. 2 is a section on the line 2—2 of Fig. 1.

Fig. 3 is a perspective view of a roller housing.

Fig. 4 is a perspective view of a modified form of roller housing.

Fig. 5 is a detail in perspective of another form of roller housing.

Fig. 6 is a sectional view similar to Fig. 2, showing the housing illustrated in Fig. 5.

Fig. 7 is a sectional view showing the housing illustrated in Fig. 5, in elevation.

Fig. 8 is a developed length of the outer barrel portion or cage.

Fig. 9 is a section on the line 9—9 of Fig. 8.

This bearing cage comprises an outer barrel portion $a$, which is provided with the side flanges $b$ and the perforations $c$. These perforations are cut out to conform with the shape of the two-taper roller bearing shown in the drawings, though obviously they could be cut to conform to the contours of various bearings. A plurality of roller housings $d$, each provided with side walls $x$ and perforations $e$, are fitted about the rollers $f$, and the said rollers projecting through the perforations $e$ in the housing, and the perforation $c$ in the outer barrel portion, as clearly shown in Fig. 1.

To assemble the roller and roller housing as shown in Figs. 2 to 4 inclusive, the side flanges $b$ of the outer barrel portion or cage are peened over as at $g$ thereby securing each housing to the outer cage, the rollers which project through the perforations in the cage keying the housing to the barrel portion in such a way as to prevent the housing from becoming misplaced. The peened over lips of the flanges prevent the roller and housing from dropping out of the channel formed by the outer cage and the side flanges. In Fig. 4, I show a roller housing which is provided with the struck-up lips $h$, which are curved to conform to the circular cross section of the roller. This provides a greater bearing surface for the roller. The side walls $x$ provide additional intermediate bearing surfaces for the roller.

In Figs. 6 to 8 inclusive, I show a form of roller housing which is shaped or bent to conform to the taper of the roller as at $i$. At one end of the housing the side flanges are undercut as at $k$. Only one side flange of the outer cage is bent in as at 10, (see Fig. 6) and the housing is fitted into the recess formed by this bent-in flange. After all the rollers are fitted in their proper places, the other flange of the outer cage is forced in by a suitable tool to grip the undercut side flange of the roller housing. This will secure all the housings in place.

With these housings, each roller is secured to the outer barrel or cage and housed independent of the adjacent roller and any one of the rollers may be removed by bending up a portion of the flange of the outer cage which grips the undercut portion of the housing that is to be removed, without disturbing the remaining rollers or without destroying the proper spacing of the rollers with respect to each other. Most of the bearing cages of the prior art show races which are so secured to the outer cages that one of the rollers cannot be removed without disturbing all the others. My bearing possesses a decided advantage over the prior art as the rollers may be quickly assembled to the cage and yet may be easily removed if it is desired to replace a worn roller with a new one, without disturbing the remaining rollers.

What I claim is:

1. A bearing cage, having in combination a barrel portion provided with apertures, rolling elements projecting through and located by the apertures and arranged to contact with an outer bearing race, and a plurality of roller housings each separately secured to the barrel portion for separately supporting each rolling element and each provided with a perforation, the said rolling elements projecting therethrough to contact with an inner bearing race.

2. A bearing cage, having in combination a barrel portion provided with apertures, rolling elements projecting through and located by the apertures and arranged to contact with a bearing race, and a plurality of roller housings each having side walls for providing an intermediate bearing for the rolling elements confined between said side walls, the said roller housings secured to the barrel portion for the purpose of independently supporting each rolling element.

3. A bearing cage, having in combination a barrel portion provided with apertures, two-tapered rolling elements projecting through the apertures and arranged to contact with a bearing race, said barrel portion being circumferentially grooved, the cross section of said groove conforming to the longitudinal contour of the rolling element, to secure the maximum amount of metal between the apertures and means for securing said rolling elements to the barrel portion.

4. A bearing cage, having in combination a barrel portion provided with apertures, rolling elements projecting through and located by the apertures and arranged to contact with a bearing race, and a single housing for separately securing each roller to said barrel portion independently of the adjacent roller and roller housing.

5. A bearing cage, having in combination a barrel portion provided with apertures, rolling elements projecting through the apertures and arranged to contact with a bearing race, and a plurality of roller housings secured to the barrel portion and provided with apertures, each housing provided with turned-out lips at the side of the aperture to provide a bearing surface for the rolling elements.

In testimony whereof I have affixed my signature.

LEO S. CHRISTOPHERSON.